(12) United States Patent
Wilkinson (10) Patent No.: US 10,595,163 B2
(45) Date of Patent: *Mar. 17, 2020

(54) APPARATUS AND METHOD FOR UPDATING DIRECTIONS TO A CONTAINER

(71) Applicant: Walmart Apollo, LLC, Bentonville, AR (US)

(72) Inventor: Bruce W. Wilkinson, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/232,785

(22) Filed: Dec. 26, 2018

(65) Prior Publication Data

US 2019/0132704 A1 May 2, 2019

Related U.S. Application Data

(63) Continuation of application No. 15/230,094, filed on Aug. 5, 2016, now Pat. No. 10,200,820.

(60) Provisional application No. 62/202,714, filed on Aug. 7, 2015.

(51) Int. Cl.
*H04W 4/00* (2018.01)
*H04W 4/02* (2018.01)
*G01S 19/49* (2010.01)
*A47G 29/14* (2006.01)
*H04W 4/70* (2018.01)

(52) U.S. Cl.
CPC .......... *H04W 4/027* (2013.01); *A47G 29/141* (2013.01); *G01S 19/49* (2013.01); *H04W 4/70* (2018.02); *A47G 2029/144* (2013.01); *A47G 2029/149* (2013.01); *A47G 2200/066* (2013.01); *A47G 2200/166* (2013.01)

(58) Field of Classification Search
CPC . H04M 1/72527; H04M 1/725; H04W 4/027; H04W 68/005; H04W 4/005; H04W 4/00; G06F 17/2881; G06F 17/28
See application file for complete search history.

(56) References Cited

U.S. PATENT DOCUMENTS 7,324,666 B2  1/2008 Zoken
7,920,968 B2  4/2011 Chapin
9,244,147 B1* 1/2016 Soundararajan .......... G01S 1/44
(Continued)

OTHER PUBLICATIONS

PCT; App. No. PCT/US2016/044983; International Search Report and Written Opinion dated Oct. 7, 2016.
(Continued)

*Primary Examiner* — Dong-Chang Shiue
(74) *Attorney, Agent, or Firm* — Fitch, Even, Tabin & Flannery LLP (57) ABSTRACT

Systems, apparatuses, and methods are provided herein for updating directions to a container. In one embodiment an apparatus for updating directions to a container comprises a container housing, a movement sensor attached to the container housing, a wireless transceiver; and a control circuit coupled to the movement sensor and the wireless transceiver. The control circuit being configured to: detect a relocation of the container housing via the movement sensor, determine an estimated new location of the container, and send, via the wireless transceiver, the estimated new location to a computing device to initiate an update of a direction to the container.

20 Claims, 5 Drawing Sheets

(56) References Cited

U.S. PATENT DOCUMENTS

| | | | |
|---|---|---|---|
| 10,200,820 B2 | 2/2019 | Wilkinson | |
| 2002/0177476 A1* | 11/2002 | Chou | G01S 5/0027 |
| | | | 455/574 |
| 2006/0122852 A1 | 6/2006 | Moudy | |
| 2007/0016368 A1* | 1/2007 | Chapin | G01C 21/3602 |
| | | | 701/426 |
| 2009/0296990 A1* | 12/2009 | Holland | G06T 7/60 |
| | | | 382/106 |
| 2010/0033329 A1 | 2/2010 | Davis | |
| 2010/0039314 A1* | 2/2010 | Gupta | G01S 5/0072 |
| | | | 342/357.31 |
| 2010/0234993 A1* | 9/2010 | Seelinger | B25J 9/1697 |
| | | | 700/254 |
| 2011/0273852 A1* | 11/2011 | Debrody | G09F 3/0317 |
| | | | 361/747 |
| 2014/0218242 A1* | 8/2014 | Platzer | G01S 5/0027 |
| | | | 342/454 |
| 2017/0041451 A1 | 2/2017 | Wilkinson | |

OTHER PUBLICATIONS

USPTO; U.S. Appl. No. 15/230,094; Notice of Allowance dated Sep. 26, 2018.
USPTO; U.S. Appl. No. 15/230,094; Office Action dated Apr. 24, 2018.
USPTO; U.S. Appl. No. 15/230,094; Office Action dated Aug. 24, 2017.
USPTO; U.S. Appl. No. 15/230,094; Office Action dated Dec. 26, 2017.

* cited by examiner

APPARATUS AND METHOD FOR UPDATING DIRECTIONS TO A CONTAINER

RELATED APPLICATIONS

This application is a continuation of U.S. application Ser. No. 15/230,094 filed 2016 Aug. 5, 2016, which claims the benefit of U.S. Provisional Application No. 62/202,714, filed Aug. 7, 2015, both which are incorporated herein by reference in their entireties.

TECHNICAL FIELD

This invention relates generally to item delivery services.

BACKGROUND

For most postal services, mailboxes remain stationary and are placed in prominent places to allow mail carriers to easily spot the receptacle. Other delivery services, such as parcel delivery and direct home delivery, conventionally do not use delivery receptacles. Parcels are often simply left by the door of a residence.

BRIEF DESCRIPTION OF THE DRAWINGS

Disclosed herein are embodiments of apparatuses and methods for updating directions to a container. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for updating directions to a delivery container. An apparatus for updating directions to a container includes a container housing, a movement sensor attached to the container housing, a wireless transceiver, and a control circuit coupled to the movement sensor and the wireless transceiver. The control circuit being configured to detect a relocation of the container housing via the movement sensor, determine an estimated new location of the container, and send, via the wireless transceiver, the estimated new location to a computing device to initiate an update of a direction to the container.

When a delivery person wishes to locate a delivery receptacle crate placed at the residence of a customer, Global Positioning System (GPS) sensors can provide coordinates for latitude and longitude. While GPS can help a driver navigate to the customer's premise, having the coordinates alone are not always helpful for the delivery person to know where the delivery receptacle is relative to the house. In some circumstances, the precision of GPS may also not be sufficient to provide a precise location of a delivery receptacle at a house.

A system may use the satellite image of the home structure closest to the average GPS coordinates of the delivery receptacle that matches the address associated with the delivery receptacle to provide better directions. The system may use image processing to locate the delivery receptacle within the premise and identify a relative location such as right, left, front, and back of a house. The accuracy of the description may be improved through feedback from delivery persons. The delivery person may have a more accurate geolocation device, the location of which could be recorded when the delivery receptacle is opened. Additional feedback may be provided in the form of a note from the delivery person indicating a description of delivery receptacle's location.

Current GPS systems provide directions to an address associated with a latitude and longitude of the GPS coordinates. Embodiments of the disclosure provide the directions to the relative position of the delivery receptacle to the address of the customer and allow the system to update where the delivery receptacle can be found at a customer's address.

After a customer signs up to have a delivery receptacle (e.g. a smart crate) the container is delivered to the address of the customer. The customer may place the smart crate at a location on their property that meets any zoning covenants and customer's preferences. Once the smart crate is placed and when it has been stationary for a reasonable period of time, the box will make contact with the cloud server to indicate that it has stopped moving and provide its new geolocation coordinates.

The cloud server may know that a new customer/crate has been added to the system so that it executes a process of using satellite image, address of home, and GPS information from the container to do image processing. The main structures of the home may be mapped and the GPS location of the smart create may be is identified relative to the home structure. The result of the image analysis may then be converted into direction descriptions like "located on the right side of the house behind the fence." This description may be further modified and/or supplemented when a delivery person with a more accurate GPS device opens the smart crate. The opening of the crate may cause the cloud server to receive a new GPS coordinate for the crate based on a geolocation device carried by the person who opened the crate. The process may be repeated to further update the direction description. If the delivery person encounters special circumstances for this delivery then they can enter a special comment. This comment would be added to the direction description so subsequent delivery would be easier.

In the event the customer chooses to move the smart crate to another location around their house, then the smart crate may detect that it is being moved by detecting a change in the accelerometer and/or GPS signals. Once the smart crate has been stationary for a set amount of time, then the process for adding a new smart crate may be repeated. The result would be a new direction description update for future deliveries.

Figure 1:
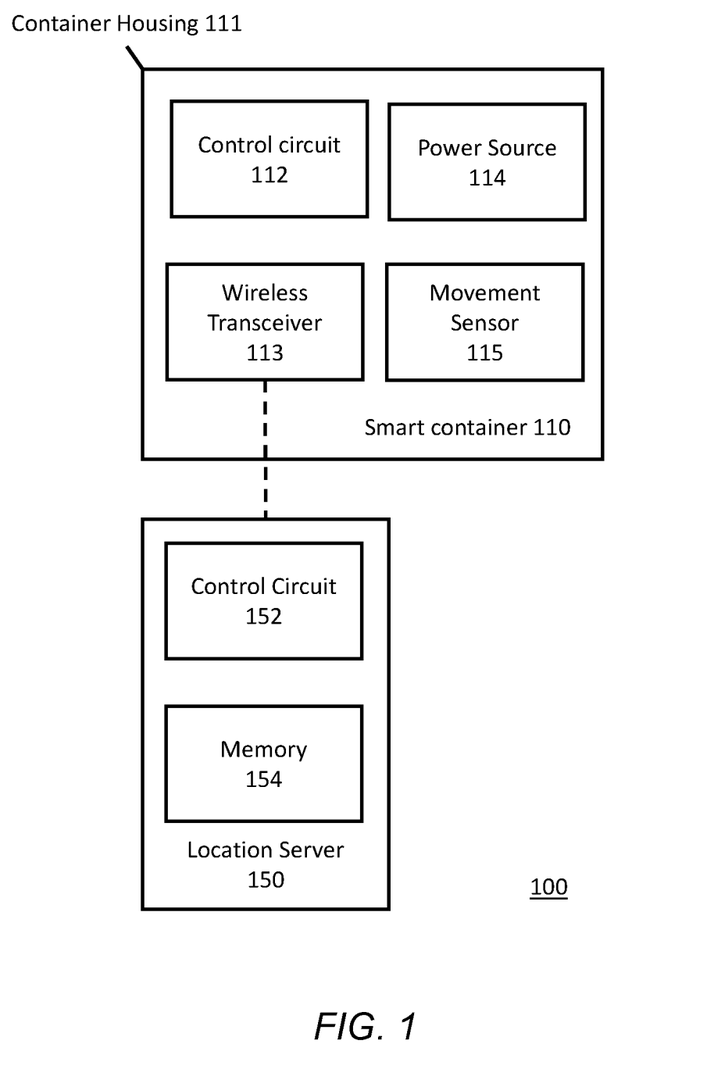
FIG. 1 is a block diagram of a system in accordance with several embodiments.

Referring now to FIG. 1, a system for updating directions to a container is shown. The system 100 includes a smart container 110 and a location server 150.

The smart container 110 includes a control circuit 112, a power source 114, a wireless transceiver 113, and a movement sensor 115, coupled to a container housing 111. The smart container 110 may generally be referred to as a delivery receptacle and/or a crate. The control circuit 112 may be one or more of a processor, a microcontroller, a microprocessor, etc. The control circuit 112 is configured to receive an indication that the container has been moved from the movement sensor 115 and determine an estimated new location. The estimated new location may then be communicated to the location server 150 via the wireless transceiver. In some embodiments, the control circuit 112 may perform one or more steps described in FIGS. 3 and 5 described herein by executing a set of computer readable instructions stored on a memory device (not shown) coupled to the control circuit 112. In some embodiments, the control circuit 112 may comprise hardware modules for performing the one or more steps described in FIGS. 3 and 5.

The wireless transceiver 113 may be one or more of a mobile data transceiver, a satellite transceiver, a wi-fi transceiver, a Bluetooth transceiver, and the like. The wireless transceiver 113 may communicate with the location server 150 via one or more of the customer's home network, mobile network, wireless network, the Internet and the like. In some embodiments, the smart container 110 may include a transmitter only, instead of a transceiver. For example, the smart container 110 may be configured to update its new estimated location by transmitting the new location without receiving a response/confirmation from the location server 150.

The power source 114 may be one or more of a battery, a solar cell array, a wall outlet, and the like. The power source 114 is configured to provide power to one or more of the control circuit 112, the wireless transceiver 113, and the movement sensor 115. In some embodiments, the power source 114 may be configured to only power the movement sensor 115 in stand-by mode. When the movement sensor 115 detects a movement, then the power may be supplied to the control circuit 112 and/or the wireless transceiver 113 to update the new estimated location.

The movement sensor 115 generally may be any sensor configured to detect a movement. The movement sensor 115 may comprise one or more of accelerometers, a gyroscope, a vibration sensor, a GPS receiver, a cellular signal receiver, a range sensor, etc. Generally, the movement sensor 115 may be any sensor configured to detect a relocation of the container housing. In some embodiments, the movement sensor 115 may also provide information to the control circuit 112 for determining an estimated new location after the movement. For example, a GPS receiver or a cellular signal receiver may be configured to detect a new location based on the received signal once the smart container 110 has stopped moving. In some embodiments, the movement sensor 115 may provide a movement distance and movement direction such that dead reckoning can be performed from an original location to estimate a new location. In some embodiments, separate sensors may be used detect the movement of the container housing 111 and to estimate a new location. For example, an accelerometer may be used to detect that a relocation is occurring and a GPS sensor may be used to estimate the new location once the container has stopped moving.

The container housing 111 may include any container for holding delivered goods such as a crate, a cooler, a chase, a lock box, etc. The container housing 111 may include an access opening such as a lid, a sliding door, etc. The container housing 111 may further include means to secure the content of the container such as a key lock, a digital lock, a magnetic lock, etc. One or more of a control circuit 112, the power source 114, the wireless transceiver 113, and the movement sensor 115 may be enclosed and/or integrated with the container housing. In some embodiments, a control circuit 112, the power source 114, the wireless transceiver 113, and the movement sensor 115 may be part of a control unit that is mounted on the inside or the outside of the container housing 111. Generally, the movement sensor 115 may be attached to the container housing 111 in a way as to allow the sensor to sense a relocation of the container housing 111.

In some embodiments, the smart container 110 further includes a lid sensor configured to detect when a lid or a door of the container housing is opened and/or closed. The control circuit may be further configured to send a notification to the computing device when the lid of the container is being operated. When the location server 150 receives a notification that the lid of the container is opened, the location server 150 may use the location information of a device carried by the person that opened the lid to obtain information relating to the location of the smart container 110.

In some embodiments, the smart container 110 may include other components such as sensors for determining what items have been placed and/or removed from the container (e.g. barcode scanner, radio frequency identification (RFID) scanner, etc.) and sensors for monitoring environmental conditions (e.g. temperature sensor, moisture sensor, etc.).

The location server 150 includes a control circuit 152 and a memory 154. The memory 154 may have stored upon it computer executable codes that cause the control circuit to update directions to one or more containers associated with the location server 150. The location server 150 may generally refer to a server, a central computer system, a computing device and the like. A directions database (not shown) may be coupled to or be included in the location server 150 that stores the directions to each of the containers served by the location server 150. The directions database may be implemented with the memory 154 or be separately implemented. When the location server 150 receives a new estimated location from the smart container 110, the control circuit 152 is configured to initiate an update of the direction to the smart container 110 in the direction database. The location server 150 may be further configured to provide directions to a container stored in the directions database for deliveries. In some embodiments, the direction may be provided in human natural language (e.g. "the crate is located on the right side of the house behind the hedge."). Natural language directions may be viewed by the delivery personnel through a user interface on a portable device. In some embodiments, the direction may be provided as machine readable instructions via navigation devices and/or automatous transport devices such as delivery drones.

In some embodiments, the location server 150 maintains and updates only the directions for locating the smart container 110 within the customer's premise. That is, the location server 150 helps the delivery personnel locate the smart container 110 once he/she arrives at the customer's premise. The navigation instructions to get to the customer's premise may be provided by another conventional car navigation system. In some embodiments, the location server 150 is configured to also update and/or provide driving directions. For example, the system 100 may permit a customer to take the smart container 110 when they travel and/or move, and the system 100 may automatically detect the customer's new address through the smart container 110 to provide an updated direction to the container and continue the home delivery service without interruption.

Figure 2:
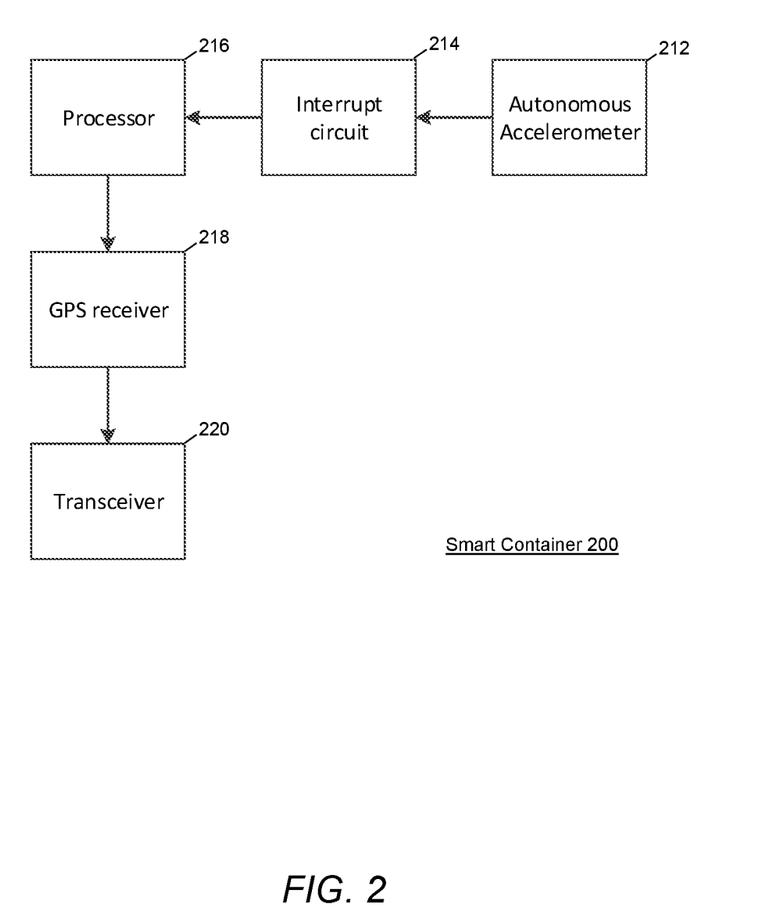
FIG. 2 is a block diagram of an apparatus in accordance with several embodiments.

Referring now to FIG. 2, a system for updating directions to a container is shown. Smart container 200 may comprise one or more components of the smart container 110. Generally, smart container 200 represents one embodiment of a container that may be used to implement the methods described herein. The smart container 200 includes an autonomous accelerometer 212, an interrupt circuit 214, a processor 216, a GPS receiver 218, and a transceiver 220. In some embodiments, the autonomous accelerometer 212 and the GPS receiver 215 may comprise the movement sensor 115. The processor 216 and the transceiver 220 may comprise the control circuit 112 and the wireless transceiver 113 in FIG. 1 respectively.

The autonomous accelerometer 212 may be an always-on sensor that constantly monitors the movement of the smart container 200. When the autonomous accelerometer 212 detects a movement of the smart container 200, it may cause the interrupt circuit 214 to "wake" the processor 216. In some embodiments, the autonomous accelerometer 212 may be configured to distinguish between minor movements (such as the movements caused by the opening and closing of the smart container 200) and significant movements associated with a relocation of the smart container 200.

The interrupt circuit 214 may be configured to detect a change in the signal from the autonomous accelerometer 212 and wake the processor 216. The interrupt circuit 214 may wake the processor 216 by causing power to be supplied to the processor 216 and/or relating the signals from the autonomous accelerometer 212 to the processor 216. In some embodiments, the processor 216 may be configured to determine whether the movement detected by the autonomous accelerometer 212 corresponds to movements of relocating a container. When the processor 216 detects a relocation of the smart container 200, it may continue to monitor for movement until the movement stops. The movement of the smart container 200 may be monitored via signals from one or more of the autonomous accelerometer 212 and the GPS receiver 218 in FIG. 2. In some embodiments, the processor 216 may determine that the smart container 200 has completed its relocation when the autonomous accelerometer 212 no longer detects significant movement for a period of time (e.g. 5 minutes, 1 hour, etc.). In some embodiments, the processor 216 may determine that the smart container 200 has completed its relocation when the GPS receiver 218 has been providing a consistent coordinate for a period of time. After the processor 216 detects that the relocation of the smart container 200 is complete, the processor may determine an estimated new location using the GPS receiver and transmit that new location to a location server via the transceiver. In some embodiments, the GPS receiver 218 and the transceiver 220 may be selectively powered on by the processor 216 as needed to conserve power. In some embodiments, after the new location has been transmitted to the location server, the processor 216 may cause one or more of the processor 216, the GPS receiver, and the transceiver 220 to power down until another movement is detected by the autonomous accelerometer 212. In some embodiments, the processor 216 may wait to receive a confirmation from the location server via the transceiver 220 prior to going on a stand-by mode in which only the autonomous accelerometer 212 is powered.

Figure 3:
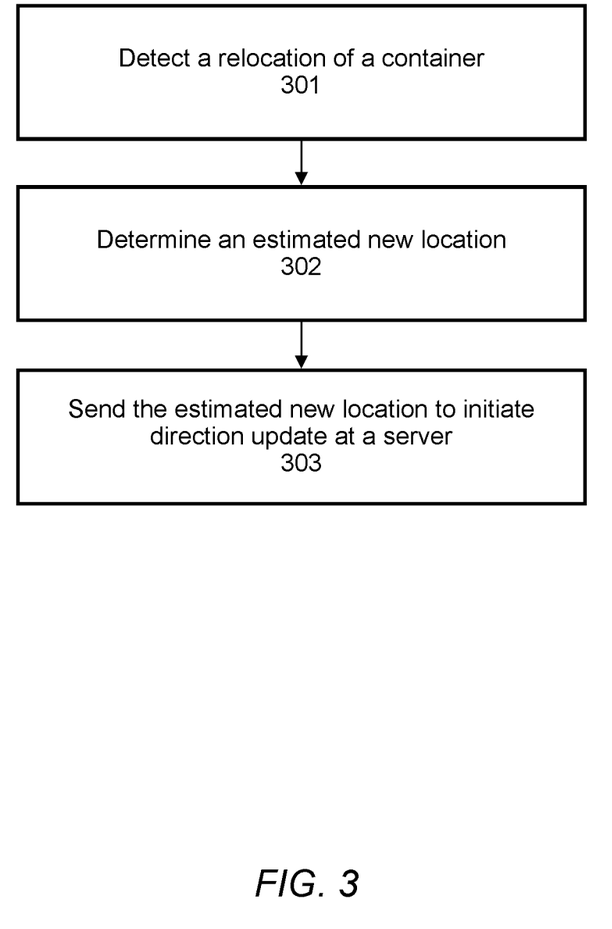
FIG. 3 is a flow diagram of a method for updating directions to a container in accordance with several embodiments.

Referring now to FIG. 3, a method for updating directions to a container is shown. Generally, the method shown in FIG. 3 may be implemented with a smart container having a movement sensor, a processor, and a transmitter. In some embodiments, the method shown in FIG. 3 may be implemented with the smart container 110 shown in FIG. 1 and/or the smart container 200 shown in FIG. 2.

In step 301, the system detects a relocation of a container. The relocation of a container may be detected with one or more of an accelerometer, a gyroscope, a vibration sensor, a GPS receiver, a cellular signal receiver, a range sensor, etc. In some embodiments, minor movements (e.g. shifts and bumps) may be distinguished from movements associated with relocation prior to proceeding to step 302.

In some embodiments, after step 301 the processor and one or more of a location sensor and a transceiver are powered on. The processor may then monitor for the container's movement to determine that the relocation has been completed. For example, the processor may detect that the container has been stationary for a set period of time prior to proceeding to step 302. In some embodiments, the location sensor and/or the transceiver are powered on only after the container has been stationary for a set period of time.

In step 302, the system determines an estimated new location of the container. In some embodiments, a container without a built-in GPS sensor may estimate a new location using distance and direction information gathered by the movement sensor and performs dead reckoning from a known initial location. In some embodiments, the container includes a location sensor such as a GPS receiver and/or a cellular network receiver. The estimated new location may be determined based on the location detected by the location sensor.

In step 303, the estimated new location is sent to a server to initiate an update of the direction to the container. The estimated new location determined in step 302 may be communicated to a location server using a transmitter via one or more of a customer home network, a cellular network, a wireless network, a satellite network, etc. The transmission may include other identifying information such as a container identifier and/or a customer identifier. The transmission is configured to cause the server to update the direction to the container based on the new location. In some embodiments, the location server is configured to perform the steps shown in FIG. 4 below upon the receipt of the transmission from the container in step 303.

In some embodiments, once the direction update is initiated the server may use another method to obtain information relating to the container's new location. For example, the server may prompt the delivery person and/or the customer to manually update the direction to the container. In another example, the server may prompt the delivery person to indicate that they have located the container and is standing right next to the container. The system may then use the location sensor on a portable device carried by the delivery person to derive a new location for the container. In some embodiments, the container may include a lid sensor. When the lid is opened, the server may be notified, and may gather location information from a portable device carried by the person who opened the lid, which may be a customer and/or a delivery person.

In some embodiments, after step 303, one or more of the processor, the GPS receiver, and the data transceiver may be powered off until further movement is detected by a movement sensor and the process returns to step 301.

Figure 4:
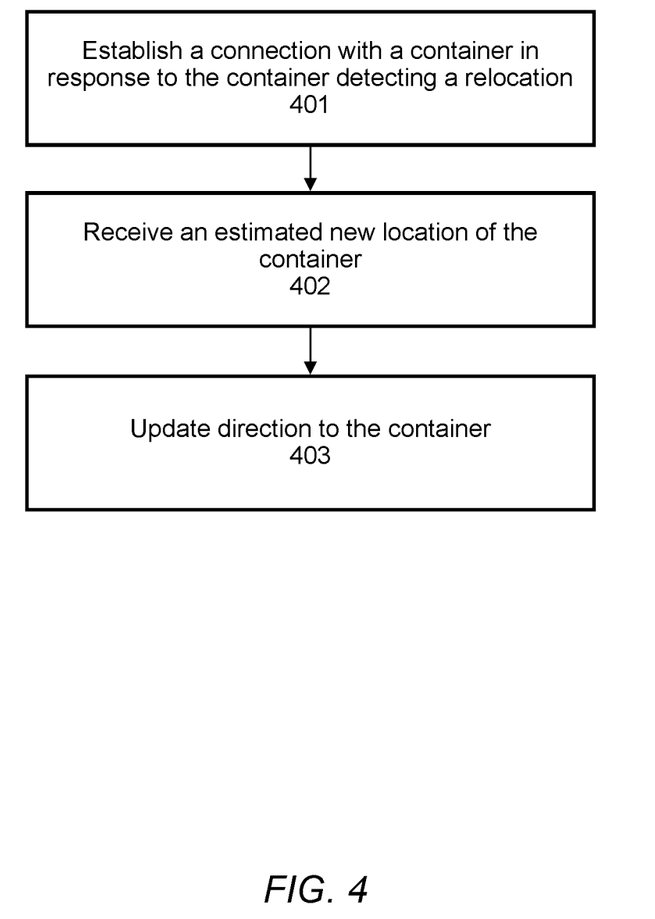
FIG. 4 is a flow diagram of a method for updating directions to a container in accordance with several embodiments.

Referring now to FIG. 4, a method for updating directions to a container at a location server is shown. Generally, the method shown in FIG. 4 may be implemented with a processor device having a control circuit and a memory device and configured to communicate with one or more smart containers described herein. In some embodiments, the method shown in FIG. 4 may be implemented with the location server 150 shown in FIG. 1.

In step 401, the system establishes a connection with the container in response to the container detecting a relocation of the container. For example, the server may receive a message from the container indicating that it has detected a relocation based on a movement sensor attached to the container. In some embodiments, the server may send messages back to the container confirming the receipt of the relocation message and/or requesting additional information. For example, the server may request the container to estimate a new location. Prior to step 401 the container and the server may not have an active communication channel. In some embodiments, the server authenticates the container as a legitimate container served by the server in step 401. The authentication may be performed by requesting credential information from the container before or after receiving the message indicating a relocation.

In step 402, the server receives an estimated new location of the container from the container. In some embodiments, the new location may be provided in the form of a coordinate such as a GPS coordinate. In some embodiments, the container may provide the unprocessed data from GPS sensors and/or cellular signal receivers to the server and the server may derive a coordinate based on the data. In some embodiments, the container may provide data from a movement sensor such as an accelerometer and/or a gyroscope and the server may calculate a new location with dead reckoning based on the last known location of the container.

In some embodiments, after step 402 the system may determine whether the direction to the container should be updated. For example, if the movement is not significant and/or if the container has been moved back near the original location a direction update may not be needed.

In step 403 the server updates the direction to the container based on the estimated new location of the container. In some embodiments, the system may combine the coordinate of the new location of the container with a satellite image of the premise associated with the container to generate a new direction to the container. For example, based on the image and the coordinate, the system may determine that the container is located near the left, right, or back side of the main structure in the satellite image by superimposing the coordinates of the container over an image associated with the address of the customer premise. In some embodiments, the system may further identify any structures on the premise, such as a wall, a fence, or a gate, that may obstruct a view to the container and direction may be provided to navigate around these obstructions. In some embodiments, the instructions may be updated to include one or more of natural language instructions to delivery persons (e.g. "the container is located on to the left of the house behind a short fence") and machine instructions to autonomous vehicles.

In some embodiments, once the direction update is initiated in step 401 the server may use other methods to obtain information relating to the container's new location. For example, the server may prompt the delivery person to manually update the direction to the container by typing in a direction once he/she locates the container. The manually entered description may be provided in addition to or in place of machine generated direction. In another example, the server may prompt the delivery person to indicate that they have located the container and is standing right next to the container. The system may then use the location sensor on a portable device carried by the delivery person to derive a new location for the container. In some embodiments, the container may include a lid sensor. When the lid is opened, the server may be notified and collect location information from a portable device carried by the person who opened the lid, which may be a customer and/or a delivery person. These additional information associated with the new location of the container may be used to further update and refine the direction to the container after step 403.

Figure 5:
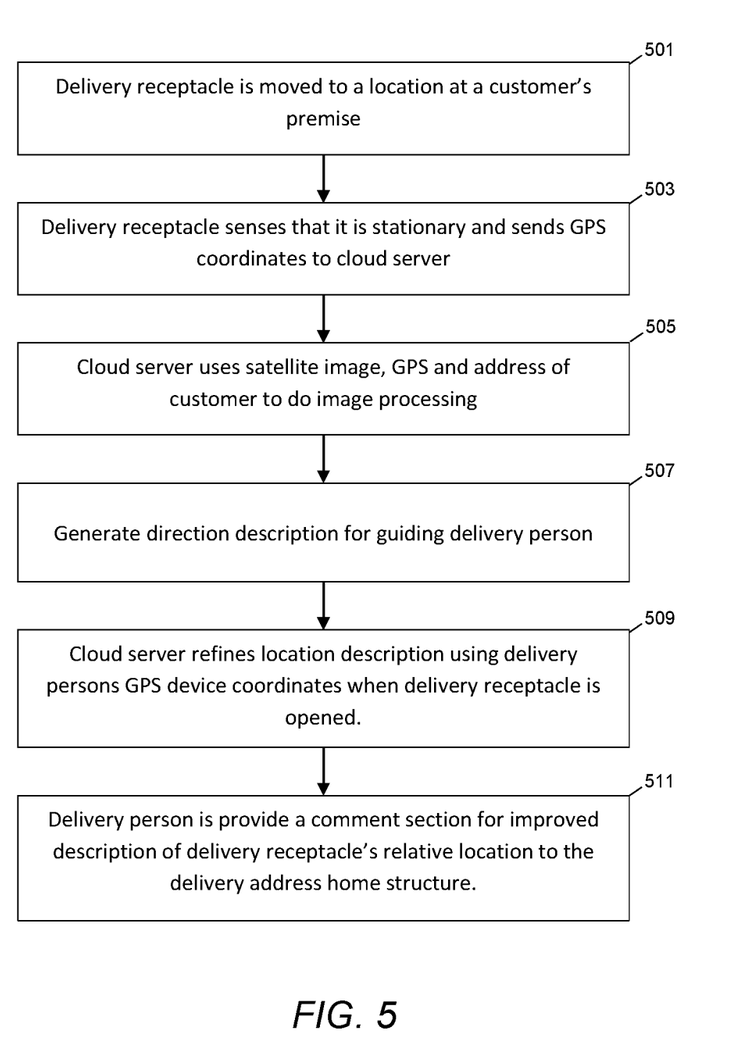
FIG. 5 is a flow diagram of a general process in accordance with several embodiments.

Referring now to FIG. 5, a process for updating directions to a container is shown. Generally, the method shown in FIG. 4 may be implemented with a computer device configured to communicate with one or more smart containers. In some embodiments, the process shown in FIG. 5 may be implemented with the system 100 shown in FIG. 1.

In step 501 a delivery receptacle is moved to a location at a customer's premise. The delivery receptacle may also be referred to as a smart container, a smart crate, and a container herein. The customer's premise may be any premise where the customer receives delivery such as the customer's temporary or permanent residence, place of business, etc.

In step 503 the delivery receptacle senses that it is stationary and sends GPS coordinates to a cloud server. The cloud server may also be referred to as a location server or a directions server herein. In some embodiments, the delivery receptacle may sense that it is stationary using one or more of a movement sensor (e.g. accelerometer, gyroscope etc.) and a location sensor (GPS sensor, cellular network receiver, etc.). In some embodiments, step 503, the GPS sensor, and the wireless transmitters of the delivery receptacle are turned on by a processor when the container senses that is stationary.

In step 505, the cloud server uses satellite images, GPS and the address of the customer to perform image processing. In some embodiments, the server uses one or more of the delivery address associated with the customer and a GPS coordinate received from the delivery receptacle to retrieve a satellite image of the customer premise. The system then overlays the GPS location of the container over the satellite image of the customer premise to determine the location of the container relative to the structures as seen in the image of the customer premise. For example, the system may identify a house, a fence, a wall etc. in the image of the customer premise. The system may then determine whether the container is located to the left, right, front, or back of these structures.

In step 507 the system generates direction description for guiding a delivery person based on the image processing in step 505. The system may turn the result of step 505 into a natural language direction description. For example, the generated message may read "the container is to the right of the house, next to the fence." The generated message may be provided to delivery persons assigned to make a delivery to the customer associated with the container.

In step 509, the cloud server refines location description using delivery persons' GPS device coordinates when the delivery receptacle is opened. The delivery receptacle may include a lid sensor that senses when the container is opened. The receptacle may notify the server and the server may, in turn, collect location information from a portable device carried by the delivery person. The location of the portable device carried by the delivery person when he/she opens the container lid may then be used as an approximate location for the container to further update the container direction. In some embodiments, the process may return to step 505, using the location derived from the portable device carried by the delivery person to perform image analysis and update the direction description in step 507.

In step 511, the delivery person is provided a comment section to provide an improved description of the delivery receptacle's relative location to the delivery address home structure. For example, at the time of delivery, a portable device may prompt the delivery person to enter comments relating to directions to the container. The delivery person may enter, for example, "the container is hidden behind the water fountain to the right of the house." One or more of the directions generated and updated in steps 507, 509, and 511 may be provided to a subsequent delivery person to assistance them in locating the receptacle to complete deliveries of items to the container.

In one embodiment, an apparatus for updating directions to a container is provided. The apparatus includes a container housing, a movement sensor attached to the container housing, a wireless transceiver; and a control circuit coupled to the movement sensor and the wireless transceiver. The control circuit being configured to: detect a relocation of the container housing via the movement sensor, determine an estimated new location of the container, and send, via the wireless transceiver, the estimated new location to a computing device to initiate an update of a direction to the container.

In one embodiment a method updating directions to a container is provided. The method includes detecting, by a control circuit, a relocation of the container via a movement sensor attached to the container, determining an estimated new location of the container, and sending, via a wireless transceiver coupled to the control circuit, the estimated new location to a computing device to initiate an update of a direction to the container.

In one embodiment, a method updating directions to a container is provided. The method includes establishing a connection with the container in response to the container detecting a relocation of the container, receiving an estimated new location of the container from the container, and updating a direction to the container based on the estimated new location.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An apparatus for updating directions to a container, comprising:
    a container housing;
    a movement sensor attached to the container housing;
    a wireless transceiver; and
    a control circuit coupled to the movement sensor and the wireless transceiver, the control circuit being configured:
        detect a relocation of the container housing via the movement sensor;
        detect a completion of the relocation based on the movement sensor not detecting movement for a set period of time;
        determine an estimated new location of the container housing after the completion of the relocation;
        cause power to be supplied to the wireless transceiver only after the completion of the relocation; and
        send, via the wireless transceiver, the estimated new location to a computing device.

2. The apparatus of claim 1, wherein the movement sensor comprises an accelerometer.

3. The apparatus of claim 1, wherein the estimated new location is determined via the movement sensor by dead reckoning from a known initial location.

4. The apparatus of claim 1, further comprising: a Global Positioning System (GPS) sensor, and wherein the estimated new location is determined based the GPS sensor.

5. The apparatus of claim 1, wherein the control circuit is further configured to turn on one or more of a GPS sensor and the wireless transceiver in response to detecting the completion of the relocation of the container.

6. The apparatus of claim 1, further comprising: a lid sensor configured to detect an opening of a lid of the container housing, wherein the control circuit is further configured to send a notification to the computing device when the lid of the container is opened.

7. The apparatus of claim 1, wherein the computing device is configured to update a direction to the container based on the estimated new location and one or more of a satellite image of a location associated with the container, a location of a portable device when the container is opened, and a manually entered description.

8. A method for updating directions to a container, comprising:
    detecting, by a control circuit, a relocation of the container via a movement sensor attached to the container;
    detecting a completion of the relocation based on the movement sensor not detecting movement for a set period of time;
    determining an estimated new location of the container after the completion of the relocation;
    causing power to be supplied to a wireless transceiver coupled to the control circuit only after the completion of the relocation; and
    sending, via the wireless transceiver, the estimated new location to a computing device.

9. The method of claim 8, wherein the movement sensor comprises an accelerometer.

10. The method of claim 8, wherein the estimated new location is determined via the movement sensor by dead reckoning from a known initial location.

11. The method of claim 8, wherein the estimated new location is determined based a Global Positioning System (GPS) sensor.

12. The method of claim 8, further comprising: turning on one or more of a GPS sensor and the wireless transceiver in response to detecting the completion of the relocation of the container.

13. The method of claim 8, further comprising:
    detecting that a lid of the container is opened; and sending a notification to the computing device to cause the computing device to retrieve a location of a portable device of a person opening the lid.

14. The method of claim 8, wherein the computing device is configured to update a direction to the container based on the estimated new location and one or more of a satellite image of an address associated with the container, a location of a portable device when the container is opened, and manually entered description.

15. A method for updating directions to a container comprising:
   establishing a connection with the container in response to the container detecting a completion of a relocation of the container wherein the container is configured to cause power to be supplied to a wireless transceiver only after detecting the completion of the relocation based on a movement sensor of the container not detecting movement for a set period of time;
   receiving an estimated new location of the container from the container; and
   updating a direction to the container based on the estimated new location.

16. The method of claim 15, further comprising:
   generating a natural language direction based on the updated direction.

17. The method of claim 15, further comprising:
   providing the direction to an autonomous vehicle as machine readable instructions.

18. The method of claim 15, wherein the updating of the direction is further based on satellite images of a residence associated with the container.

19. The method of claim 15, wherein the updating of the direction is further based on manually entered description.

20. The method of claim 15, further comprising:
   receiving a notification from the container that a lid of the container is opened; and
   retrieving a location information of a portable device associated with a person opening the lid;
   wherein the updating of the direction is further based on the location information of the portable device.

* * * * *